(12) United States Patent
Balraj et al.

(10) Patent No.: US 8,862,085 B2
(45) Date of Patent: Oct. 14, 2014

(54) DETECTION OF BINARY SIGNALING IN COMMUNICATIONS RADIO RECEIVER

(75) Inventors: Rajarajan Balraj, Duesseldorf (DE); Thorsten Clevorn, Munich (DE); Herbert Dawid, Aachen (DE)

(73) Assignee: Intel Mobile Communications GmbH, Neubiberg (DE)

( * ) Notice: Subject to any disclaimer, the term of this patent is extended or adjusted under 35 U.S.C. 154(b) by 55 days.

(21) Appl. No.: 13/455,576

(22) Filed: Apr. 25, 2012

(65) Prior Publication Data

US 2013/0288629 A1  Oct. 31, 2013

(51) Int. Cl.
*H04B 17/00* (2006.01)

(52) U.S. Cl.
USPC ............ 455/226.3; 455/522; 455/67.11; 455/67.13; 455/67.14; 455/69

(58) Field of Classification Search
CPC .................................................... H04B 17/004
USPC ............. 455/226.3, 522, 67.1, 67.3, 67.4, 69
See application file for complete search history.

(56) References Cited

U.S. PATENT DOCUMENTS 6,298,242 B1* 10/2001 Schiff ........................ 455/522
8,045,610 B2* 10/2011 Wang ......................... 375/233
2011/0305224 A1* 12/2011 Lin .............................. 370/336

OTHER PUBLICATIONS

3rd Generation Partnership Project (3GPP); Technical Specification Group (TSG); Radio Access Network (RAN); Working Group 1 (WG1); Physical Channels and Mapping of Transport Channels onto Physical Channels (FDD); TS 25.211 V2.0.0 (Apr. 1999), p. 1-43.
3rd Generation Partnership Project (3GPP); Technical Specification Group (TSG); Radio Access Network (RAN); Working Group 4 (WG4); Ultra (UE) FDD; Radio Transmission and Reception; TS 25.101 V1.0.0 (Apr. 1999), p. 1-40.

* cited by examiner

*Primary Examiner* — Sanh Phu
(74) *Attorney, Agent, or Firm* — Eschweiler & Associates, LLC (57) ABSTRACT

A radio receiver apparatus includes a demodulator configured to output a decision variable indicative of a binary indicator signaled from a transmitter over a channel to the radio receiver apparatus. The radio receiver apparatus further includes a noise power estimator configured to generate noise power estimates indicative of noise experienced at the radio receiver apparatus. A binary indicator estimator is provided to generate an estimated binary indicator based on the decision variable and the noise power estimates.

18 Claims, 7 Drawing Sheets

DETECTION OF BINARY SIGNALING IN COMMUNICATIONS RADIO RECEIVER

FIELD

The invention relates to radio communications, and more particularly to the technique of detecting binary signaling in a radio receiver apparatus.

BACKGROUND

Binary signaling is used in many applications of radio communications systems. Missed detection and false alarm detection may both degrade receiver performance. It is desirable to provide for a high receiver performance in the presence of one or more cells of the cellular radio network.

BRIEF DESCRIPTION OF THE DRAWINGS

Aspects of the invention are made more evident by way of example in the following detailed description of embodiments when read in conjunction with the attached drawing figures, wherein.

DETAILED DESCRIPTION

In the following detailed description, reference is made to the accompanying drawings, which form a part thereof, and in which is shown by way of illustration embodiments in which the invention may be practiced. It is to be understood that other embodiments may be utilized and structural or logical changes may be made without departing from the scope of the present disclosure. The following detailed description, therefore, is not to be taken in a limiting sense, and the scope of the present invention is defined by the appended claims.

It is to be understood that the features of the various exemplary embodiments described herein may be combined with each other, unless specifically noted otherwise. Further, like reference numerals designate corresponding similar parts.

As employed in this specification, the terms "coupled" and/or "connected" are not meant to mean in general that the elements must be directly coupled or connected together; intervening elements may be provided between the "coupled" or "connected" elements. However, although not restricted to that meaning, the terms "coupled" and/or "connected" may also be understood to optionally disclose an implementation in which the elements are directly coupled or connected together without intervening elements provided between the "coupled" or "connected" elements.

It should be understood that embodiments may be implemented in discrete circuits, partially integrated circuits or fully integrated circuits. Further, embodiments of the invention may be implemented on a single semiconductor chip or on multiple semiconductor chips connected to each other.

Furthermore, it should be understood that embodiments of the invention may be implemented in software or in dedicated hardware or partially in software and partially in dedicated hardware.

The following description relates to a radio receiver apparatus, in particular to a radio receiver apparatus operating in a cellular network. By way of example, the cellular network may be a CDMA (Code Division Multiple Access) cellular radio network such as, e.g., an UMTS (Universal Mobile Telecommunications System) network also referred to as UTRAN (UMTS Terrestrial Radio Access Network). Further, some multi-carrier modulation systems such as, e.g., OFDM (Orthogonal Frequency Division Multiplexing) radio communications systems including systems as stipulated in the LTE (Long Term Evolution) standard use cellular radio networks.

A radio receiver apparatus as described herein may form a part of a mobile station of a wireless network. In the following the terms mobile station and user equipment (UE) shall have the same meaning, which meaning shall comprise the definitions given in the various standards (e.g. UMTS, LTE and derivatives thereof). In the following the term UE is used. By way of example, a UE may be represented by a cellular phone, a smartphone, a tablet PC, a laptop, etc.

In a wireless network for mobile UEs the network and the UE have mechanisms to exchange binary control information regarding operations such as, e.g., establishing a connection, data transfer, etc. By way of example, pagings to specific UEs may be used to control sleep-mode procedures in the UEs. Acknowledgement procedures may be used to report information about successful or unsuccessful operations such as, e.g., data transfer operations or data processing operations. By way of example, acknowledgement procedures may be used to report about the hybrid ARQ status.

In the following, the transmission of binary information is referred to as signaling. The binary information is referred to as an indicator. Thus, in the meaning used herein, an indicator may adopt two values. The specific values may depend on the mapping of the indicator, e.g. the indicator may be mapped to $\{-1, 1\}$, $\{0, 1\}$, etc. For the sake of simplicity and without loss of generality, it is assumed in the following that a (binary) indicator is mapped to $\{-1, 1\}$.

Figure 1:
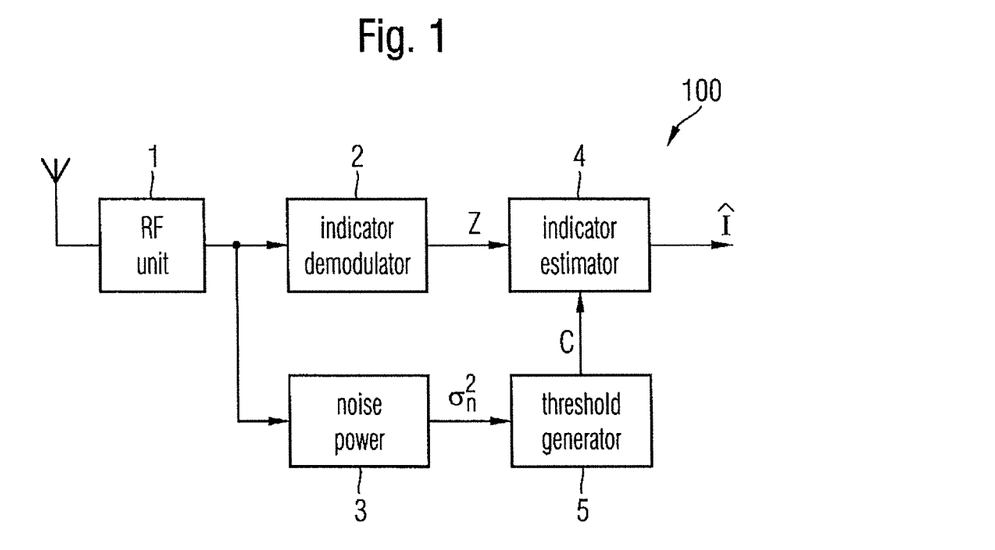
FIG. 1 is a schematic block diagram of an exemplary implementation of a radio receiver apparatus.

FIG. 1 is a block diagram illustrating an exemplary implementation of a radio receiver apparatus. The radio receiver apparatus may be implemented in a base station or in a mobile station. Without loss of generality, by way of example, it is assumed in the following that the radio receiver apparatus is implemented in a UE.

UE 100 as illustrated in FIG. 1 may comprise an RF unit 1, an indicator demodulator 2 having an input coupled to an output of the RF unit 1, a noise power estimator 3 having an input coupled to an output of the RF unit 1, and an indicator estimator 4 having an input coupled to an output of the indicator demodulator 2. Further, the UE 100 may comprise a threshold generator 5 having an input coupled to an output to the noise power estimator 3 and having an output coupled to a threshold value input of the indicator estimator 4.

In operation, the RF unit 1 may receive an input signal provided by one or more antennas. The input signal received by the RF unit 1 may be processed in the RF unit 1 by applying conventional techniques such as, e.g. filtering, down-conversion, analog-to-digital conversion and so on.

The indicator demodulator 2 is configured to demodulate an indicator channel used in the wireless communications network to transmit an indicator from the network (e.g. base station) to UE 100. The indicator demodulator 2 may use techniques to distinguish between signals from different cells and/or techniques to extract a specific channel, i.e. techniques such as descrambling and despreading, respectively, may be applied. These techniques may depend on the radio communications network used in the specific application. Examples of an indicator demodulator 2 are a PICH (Paging Indicator CHannel) demodulator as, e.g., used in UTRAN, or a PHICH (Physical Hybrid ARQ Indicator CHannel) demodulator as used e.g. in LTE networks. Further, other indicator channels for transmitting binary information are known in the art and corresponding indicator demodulators form part of the disclosure of the detailed description and may be used as an indicator demodulator 2.

Thus, the indicator demodulator 2 may receive output samples from the RF unit 1 and may apply techniques such as e.g. despreading, descrambling and maximum ratio combining to generate a decision variable Z. The decision variable Z may be supplied to the input of the indicator estimator 4.

Further, the noise power estimator 3 may receive output samples from RF unit 1 and may compute noise power estimates $\sigma_n^2$. The noise power estimates $\sigma_n^2$ may be indicative of the estimated noise power of the signal output by the RF unit 1. That is, the noise power estimates $\sigma_n^2$ may comprise the interference and white noise experienced by the UE 100. The noise power may be continuously measured in UE 100, and measurement results may be labeled by index n. Typically, the noise power of a connection is continuously monitored in a UE, and therefore, the noise power estimates $\sigma_n^2$ are readily available in the UE 100 or may easily be obtained. The same holds true for other UEs as disclosed herein.

The indicator estimator 4 is configured to generate an estimated binary indicator $\hat{I}$ based on the decision variable Z and on the noise power estimates $\sigma_n^2$. By way of example, the indicator estimator 4 may comprise a comparator configured to compare the decision variable Z with a threshold value C which is a function f of the noise power estimates $\sigma_n^2$, i.e., $C=f(\sigma_n^2)$. As depicted in FIG. 1, a threshold generator 5 may be provided and configured to generate the threshold value C based on the noise power estimates $\sigma_n^2$ and the function f. The threshold generator 5 may have an input to receive the noise power estimates $\sigma_n^2$ and an output to provide the threshold value C to the threshold input of the indicator estimator 4. Assuming the indicator is mapped to $\{-1, 1\}$, the indicator estimator 4 may decide the estimated binary indicator $\hat{I}$ by comparing the decision variable Z against the threshold C as shown in the following equation $$\hat{I} = \begin{cases} -1 & Z < -C \\ 1 & Z \geq -C \end{cases}. \quad (1)$$

By way of example, a transmission of an indicator via the indicator channel is detected if $\hat{I}=-1$ and no transmission of an indicator via the transmission channel is decided if $\hat{I}=1$.

The performance of indicator estimator 4 may be evaluated by considering the probability of missed detection $P_{md}$ and the probability of false alarm $P_{fa}$. $P_{md}$ is the probability that an indicator of value $-1$ is sent but an estimated indicator of $\hat{I}=1$ is decided. $P_{fa}$ is the probability that indicator of 1 is sent but an estimated indicator of $\hat{I}=-1$ is decided.

Conventional indicator estimators such as, e.g. MAP (maximum a posteriori) detectors typically use a threshold $C=0$. In other words, the sign of the decision variable Z is used to decide the estimated indicator $\hat{I}$. Such estimators assume that the costs for $P_{md}$ and $P_{fa}$ are the same. However, depending on the nature of the indicator to be estimated, the two error event types may result in completely different consequences. This will be exemplified further below with regard to the specific example of a paging indicator PI.

In the following, the noise power estimates $\sigma_n^2$ are taken into account when computing the threshold value C. More specifically, two exemplary implementations are disclosed how to improve the performance of an indicator estimator 4 by taking into account the noise power estimates $\sigma_n^2$ for computing the threshold value C using function f.

According to a first example referred to as a biased indicator estimator, the threshold value C may be computed according to the function $$C = \frac{\eta_{Biased}\sigma_n^2}{S_{PICH}}, \quad (2)$$

where $\eta_{Biased}>0$ and $S_{PICH}$ is the signal power of the indicator channel. The parameter $\eta_{Biased}$ may vary over a wide range and may, e.g. be set to ¼, in one embodiment.

The biased indicator estimator 4 according to equation (2) reduces the false alarm probability $P_{fa}$ at a lower SNR (signal-to-noise ratio) at the expense of a higher missed detection probability $P_{md}$. At a higher SNR the probability of missed detections $P_{md}$ may converge to that of a conventional MAP detector using $C=0$.

According to a second example, which is referred to in the following as an extended bias indicator estimator 4, the threshold value may be made dependent on the noise power $\sigma_n^2$, as given in the following equation $$C = \left(\frac{\eta_{SINR}\sigma_n^2}{SINR_{PICH}} - 1\right) \times \eta_{DistanceMetric}, \quad (3)$$

where $\eta_{SINR}>0$ and $0<\eta_{DistanceMetric}\leq 1$, with $$SINR_{ICH} = \frac{S_{ICH}}{\sigma_n^2}.$$

The parameter $\eta_{SINR}$ may vary over a wide range and may, e.g. be set to 1. The parameter $\eta_{DistanceMetric}$ may e.g. be set to ¼.

Similar to the biased indicator estimator 4, the extended biased indicator estimator 4 according to equation (3) reduces the false alarm probability $P_{fa}$ at a lower SNR. Further, different from the biased indicator estimator 4, the extended biased indicator estimator 4 reduces the probability of missed detection $P_{md}$ at higher SNR. This reduction at higher SNR may possibly be better than in conventional MAP detectors using $$C=0.$$

It is to be noted that function f, as given by equation (2), is a homogeneous linear function with the proportionality factor being given by $\eta_{Biased}/S_{PICH}$. The function f as given by equation (3) is an nonhomogeneous linear function, i.e. the function value at $\sigma_n^2=0$ is different from zero and, more particularly, is negative.

Figure 2:
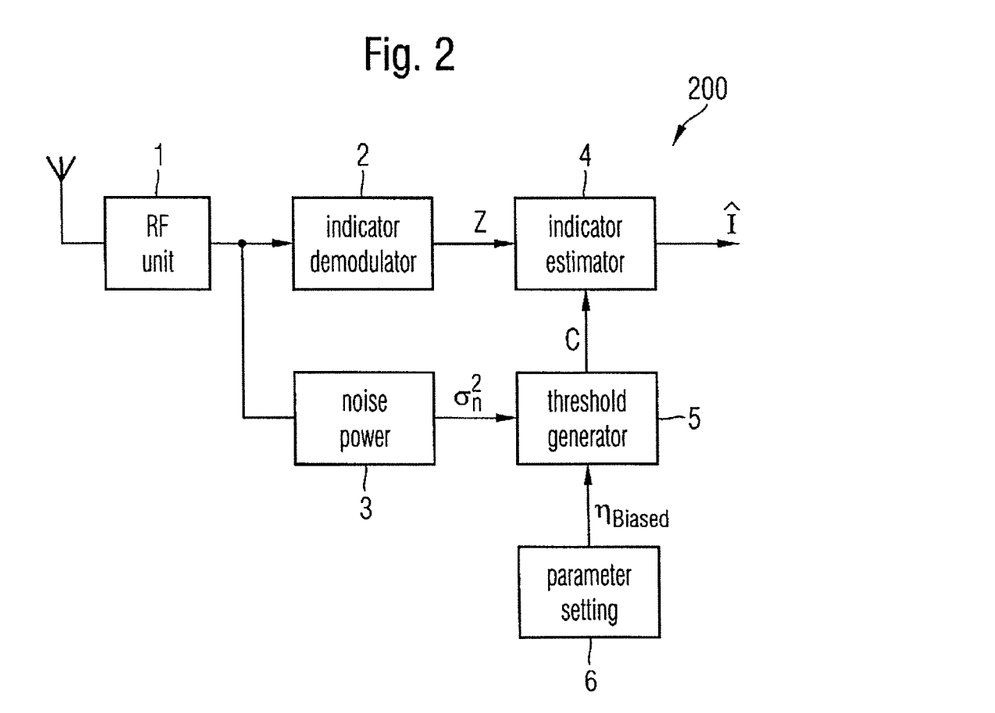
FIG. 2 is a schematic block diagram of an exemplary implementation of a radio receiver apparatus.

According to FIG. 2, an exemplary UE 200 may implement a biased indicator estimator 4 according to equation (2). For the sake of brevity, reference is made to the description of UE 100, which is applicable to FIG. 2. Further, UE 200 may comprise a parameter setting unit 6. The parameter setting unit 6 is configured to provide the parameter $\eta_{Biased}$ to the threshold generator 5. The parameter $\eta_{Biased}$ may be set to a constant value or may be variable.

Figure 3:
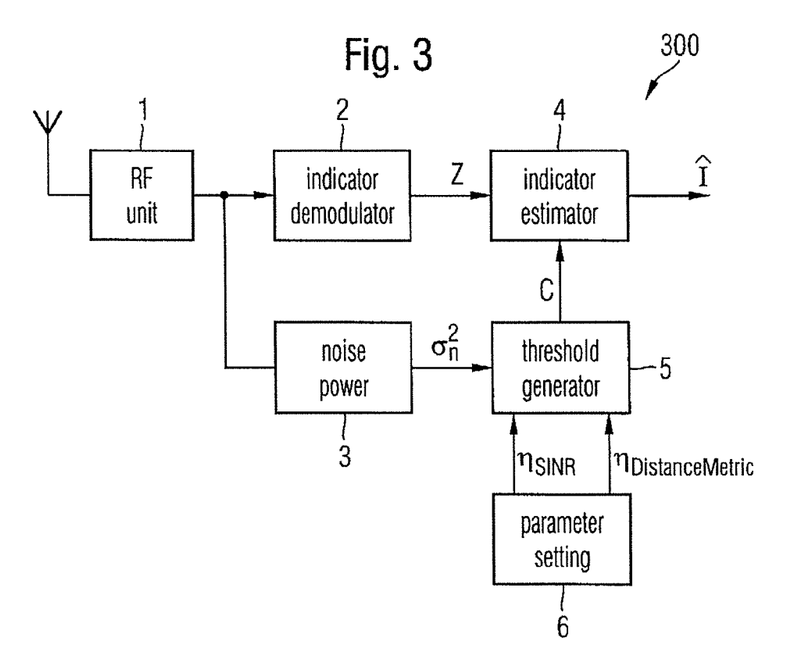
FIG. 3 is a schematic block diagram of an exemplary implementation of a radio receiver apparatus.

According to FIG. 3, an exemplary UE 200 may implement an extended biased indicator estimator 4 according to equation (3). For the sake of brevity, reference is made to the description of UE 100, which is applicable to FIG. 3. Further, UE 300 may comprise a parameter setting unit 6. The parameter setting unit 6 is configured to provide the parameters $\eta_{SINR}$ and $\eta_{DistanceMetric}$ to the threshold generator 5. The parameters $\eta_{SINR}$ and/or $\eta_{DistanceMetric}$ may each be set to a constant value or may each be set to a variable value.

Figure 4:
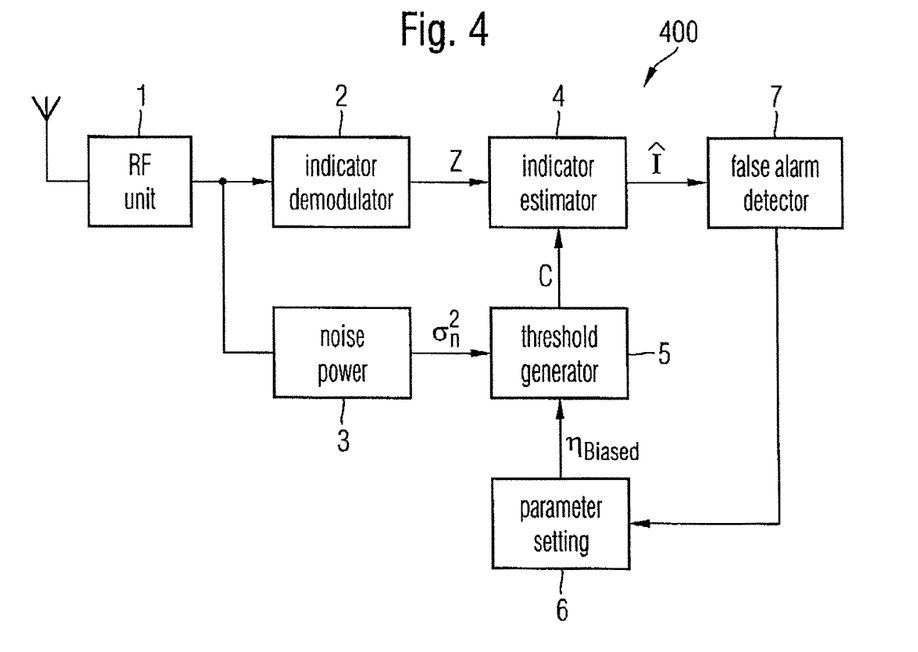
FIG. 4 is a schematic block diagram of an exemplary implementation of a radio receiver apparatus in accordance with FIG. 2, further comprising a feedback loop.

According to FIG. 4, a UE 400 having the same structure as UE 200 may further comprise an estimation error detector, e.g. a false alarm detector 7. By way of example, a false alarm detector 7 is considered. The false alarm detector 7 is configured to determine the false alarm rate of indicator estimation $\hat{I}$ as performed by indicator estimator 4. To that end, the false alarm detector 7 may additionally receive information which could be utilized to check whether the indicator estimation $\hat{I}$ is correct or not. There are a variety of mechanisms on how UE 400 may get knowledge about the correctness of indicator estimation. By way of example, if the indicator to be estimated is a paging indicator, a false alarm (i.e. $\hat{I}=-1$ although indicator of 1 has been transmitted) will be recognized by the UE 400 upon trying to demodulate the paging information announced by the erroneously detected paging indicator. In fact, in the case of a false alarm, there is no paging information which could be demodulated, indicting that $\hat{I}=-1$ was wrongly estimated.

The false alarm detector 7 may detect false alarm events and may output a false alarm rate. The false alarm rate output by the false alarm detector 7 may be reported back to the parameter setting unit 6. In this example, the parameter setting unit 6 may form part of a feedback structure. More specifically, the parameter setting unit 6 may evaluate the false alarm rate reported by the false alarm detector 7 and, on the basis of the evaluation result, the value of the parameter $\eta_{Biased}$ may be varied. Thus, in general terms, the parameter setting accomplished by parameter setting unit 6 is responsive to the performance of the indicator estimator 4. The performance (or quality) of the indicator estimator 4 may also be measured by other quantities indicative of the performance (or quality) of the indicator estimation than the false alarm rate, e.g. the rate of missed detection, etc. In this case, the false alarm detector 7 may generally be an estimation error detector configured to detect an error of the estimated binary indicator.

Figure 5:
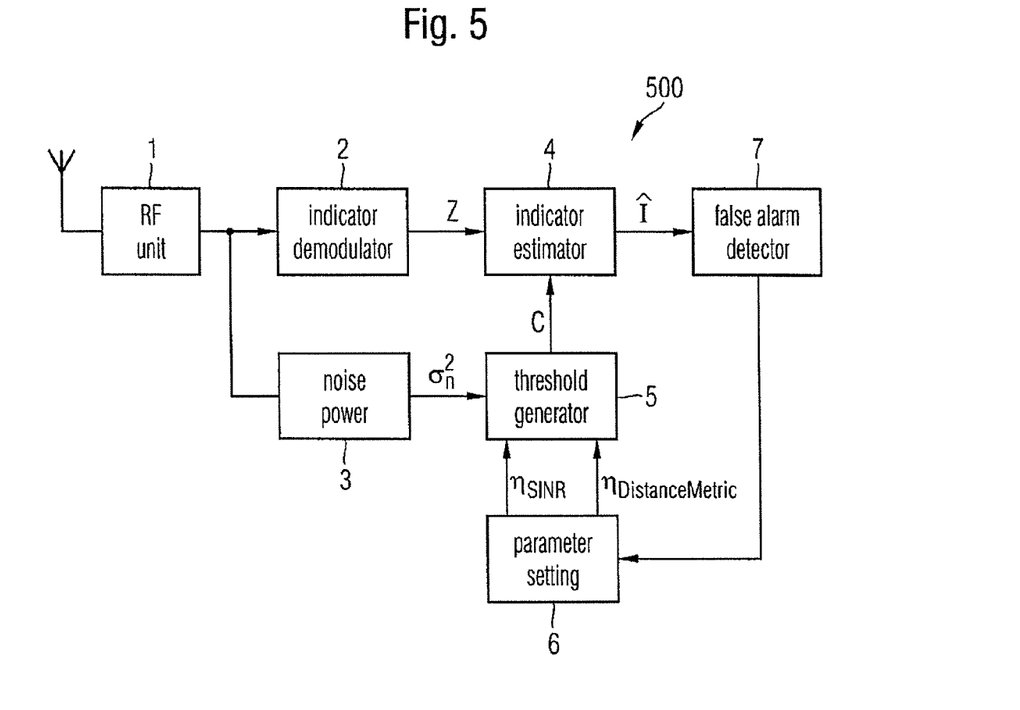
FIG. 5 is a schematic block diagram of an exemplary implementation of a radio receiver apparatus in accordance with FIG. 3, further comprising a feedback loop.

According to FIG. 5, an exemplary UE 500 may have the same structure as UE 300 and, similar to UE 400, may be further provided with a false alarm detector 7 (or, more generally, an estimation error detector configured to detect an error of the estimated binary indicator). In view of the estimation error detector (or, more specifically, false alarm detector 7), reference is made to the description in conjunction with FIG. 4. In UE 500 the false alarm rate (more generally: estimation error rate) issued by false alarm detector 7 may effect both the setting of $\eta_{SINR}$ and/or the setting of $\eta_{DistanceMetric}$. More specifically, parameter $\eta_{SINR}$ may be varied by the parameter setting unit 6 based on the false alarm rate detected by the false alarm detector 7 and/or the parameter $\eta_{DistanceMetric}$ may be varied by the parameter setting unit 6 based on the false alarm rate (more generally: estimation error rate) issued by the false alarm detector 7 (more generally: estimation error detector).

It is to be noted that a variation of one or more of the parameters $\eta_{Biased}$, $\eta_{SINR}$, and $\eta_{DistanceMetric}$ causes the function f according to equation (2) and (3), respectively, to change. Typically, the function f is changed or modified such that increased threshold values C are generated in case an increased estimation error rate (e.g. false alarm rate) has been determined by the estimation error detector (e.g. false alarm detector 7). That way, an increase of the estimation error rate (e.g. false alarm rate) enhances the threshold value C, resulting in that the probability of a false indicator estimation (e.g. in case of false alarm: $\hat{I}=-1$ is estimated but transmitted is $I=1$) decreases.

In the following, unless stated otherwise, a paging indicator PI is considered as an exemplary example of the indicator I used in the above description. Without saying, the above disclosure also applies to the following description. Vise versa, details of the following description are applicable too and may be combined with the examples as described above in conjunction with FIGS. 1 to 5.

The UE, e.g. UE 100 to UE 500, may be in idle mode in order to reduce power consumption. By way of example, in UTRAN DRX (discontinuous reception) is used for idle mode operation in order to increase the stand-by time of the UE. When DRX is used, the UE needs only to monitor the PICH at one known time (so-called paging occasion) during the paging interval (so-called DRX cycle).

Stand-by time of an UE increases when power consumption in idle mode is reduced. When idle the UE only performs periodic supervision procedures, e.g. supervision of the PICH. When performing the periodic supervision procedures, the UE is awake and its circuitry is partly enabled. In between such periods the UE goes asleep and most of its circuitry is disabled. The power consumption during the awake period is significantly higher (mostly due to the RF components in the RF unit 1) than when asleep. One method to reduce the awake period is the use paging indicators PI. The paging indicators PI are binary and are sent periodically once per paging cycle. If set to "ON" ($\hat{PI}=-1$), the UE must demodulate the next paging channel. Otherwise, the UE can immediately go back to idle state, considerably reducing its power consumption.

Figure 6:
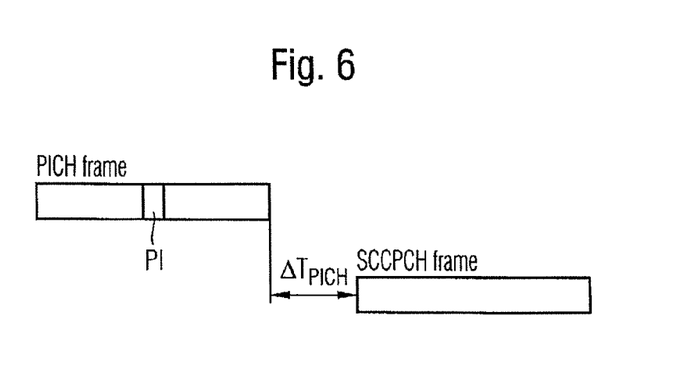
FIG. 6 is a schematic diagram depicting by way of example the timing of a paging indicator channel and a control channel associated therewith.

FIG. 6 is a diagram illustrating, by way of example, a possible structure of a PICH and a control channel associated with the PICH and referred to as SCCPCH (Secondary Common Control Physical CHannel). PICH and SCCPCH are used for pagings in UTRAN systems.

The PICH is repeatedly transmitted over radio frames having a length of e.g. 10 ms, i.e. the length of UMTS radio frames. The PICH is used to carry the PI (Paging Indicator). The PICH is always associated with an SCCPCH to which a PCH (Paging CHannel) is mapped. A PI set in a PICH frame means that paging information, also referred to as a paging message, is to be transmitted on the PCH in the SCCPCH frame. The time gap $\Delta T_{PICH}$ between the PICH and SCCPCH frames may be between 2 ms (3 slots) and 20 ms (30 slots).

Figure 7:
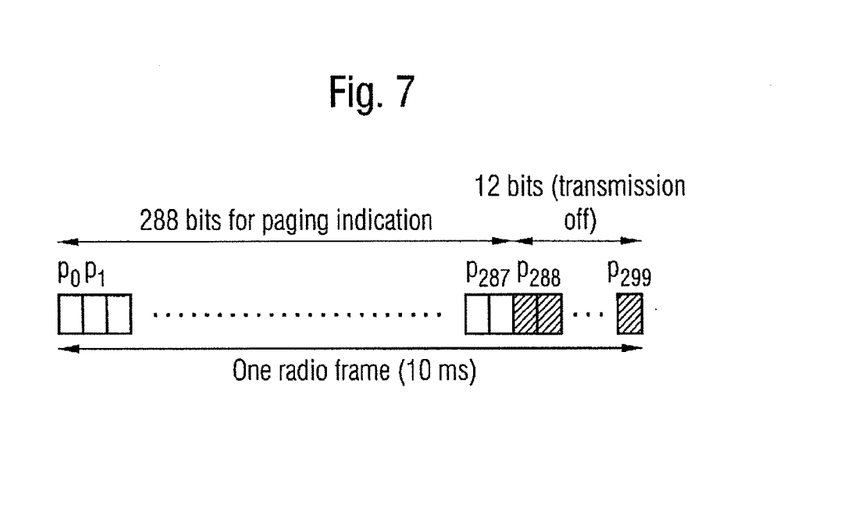
FIG. 7 is a schematic diagram depicting a structure of a paging indicator channel.

FIG. 7 illustrates the structure of the PICH. The PICH is a fixed rate (spreading factor SF=256) physical channel used to carry PI. One 10 ms PICH frame consists of 300 bits ($p_0$, $p_1$, ..., $p_{299}$). Of these 288 bits ($p_0$, $p_1$, ..., $p_{287}$) are used to carry PIs. The remaining 12 bits are not formally part of the PICH and shall not be transmitted. In each PICH frame $N_P$ paging indicators $\{PI_{10}, \ldots, PI_{N_p-1}\}$ are transmitted, where $N_P$=18, 36, 72 or 144.

The PI to be used by a certain UE is associated with the paging indicator $PI_q$. q is computed by higher layers. If a PI in a certain frame is set to "on" this is an indication that UEs associated with this PI should read the corresponding frame of the SCCPCH of the PCH.

The PICH is BPSK (Binary Pulse Shift Keying) modulated. Thus, the PICH detection accounts for PI binary decisions. PI estimation may be accomplished in accordance with the implementation examples provided in FIGS. 1 to 5. More specifically, assuming a reliable phase reference for e.g. coherent demodulation, sampled outputs after despreading, descrambling and maximum ratio combining may give rise to the decision variable $Z_{PICH}$ as in the following equations:

$$Z_{PICH} = \frac{\sum_{l=1}^{N_{bits}} Y_{PICH,i}}{S_{PICH}} \quad (4)$$

$$Y_{PICH,i} = \sum_{l=1}^{M} \frac{h_{l,i}^h h_{l,i} p_i}{\sqrt{2}} + n^*, \ 1 \leq l \leq M \text{ is the } l\text{-the path} \quad (5)$$

$$S_{PICH} = \frac{N_{bits} \times \frac{1}{N} \sum_{j=1}^{N} \sum_{l=1}^{N} h_{l,j}^h h_{l,j}}{\sqrt{2}}, \quad (6)$$

$1 \leq j \leq N$ is the number of measurement samples $$N_{bits} = \frac{288}{N_p}, \quad (7)$$

where $h_{l,i}$ are the channel estimates relating to propagation path I of a number of M propagation paths and tap i, $p_i$ is the i-th bit of the PI as sampled in the UE and n is a noise contribution. By way of example, the default setting in UMTS is $N_P$=72, leading to $N_{bits}$=4. In this case the PI comprises of four bits, e.g. $p_0, \ldots, p_3$, each having the same value. Superimposed h designates the Hermitian and superimposed * designates the conjugated complex of a variable.

Analogous to equation (1), PI estimation may be performed by comparing the decision variable $Z_{PICH}$ against the threshold C according to $$\hat{PI} = \begin{cases} -1 & Z_{PICH} < -C \\ +1 & Z_{PICH} \geq -C \end{cases}. \quad (8)$$

As mentioned earlier, MAP detectors using C=0 use the same false alarm and missed detection probabilities over all channel condition, i.e. all SNR. However, the effect of PICH false alarms and the effect of PICH missed detection are of different importance to a user.

First, the effect of PICH false alarms on stand-by time is evaluated. Without loss of generality, a specific example is used for the purpose of explanation. The average time for which a UE is awake per DRX cycle is given by the following equation:

$$\text{Awake\_time} \approx T_{PICH} + P_{fa} T_{PCH},$$

$$T_{PICH} = 7 \text{ slots}$$

$$T_{PCH} = 34 \text{ slots} \quad (9)$$

where Awake_time is the average awake time per DRX cycle. The average awake time per DRX cycle is a useful measure for battery stand-by time. Lowering the average awake time would improve stand-by time. Therefore, the average awake time per DRX cycle may be used as a metric of interest.

Figure 8:
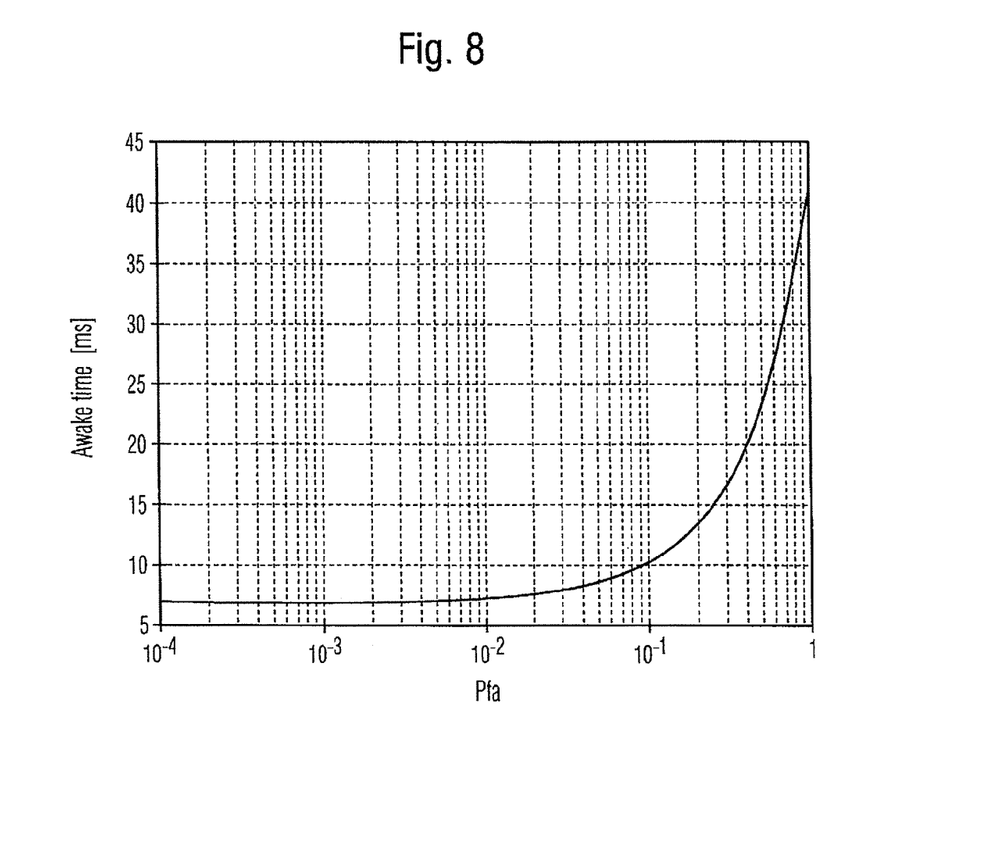
FIG. 8 is a graph illustrating by way of example the awake time of a UE versus the probability of false alarm.

The graph of FIG. 8 illustrates the awake time (in ms) in sleep mode versus $P_{fa}$ of PICH false alarm probability. As apparent from FIG. 8, reducing the false alarm probability $P_{fa}$<0.05 only provides negligible decrease in awake time.

Second, the fact of PICH missed detection on missed call rate is evaluated. The probability of missed call is given by the following equation:

$$P_{mc} = 1 - (1 - P_{fail\_DPE})(1 - P_{fail\_PCH})(1 - P_{md}) \quad (10)$$

where $P_{fail\_DPE}$ is the probability of a missed page due to a multi path searcher error and $P_{fail\_PCH}$ is the probability of a missed page due to a PCH decoding error.

As may be seen from equation (10), when channel conditions are excellent (high SNR) the missed call rate may be governed by the PICH probability of missed detection $P_{md}$. However, when channel conditions degrade, $P_{md}$ is one of many factors for a missed call. More specifically, when bad channel conditions are encountered (low SNR), a multi path search as well as PCH decoding becomes difficult and therefore, multi path search errors and/or PCH decoding errors may govern the probability of missed call $P_{mc}$. In such conditions, reducing the PICH missed detection probability $P_{md}$ would only provide negligible improvement in missed call rates.

According to the approach of the biased indicator estimation as described above with reference to equation (2), the threshold value C may be given according to the following equations:

$$C = C_{Biased} = \frac{\eta_{Biased} \sigma_n^2}{S_{PICH}}, \text{ where } \eta_{Biased} > 0, \quad (11)$$

$$\sigma_n^2 = \frac{1}{M} \sum_{l=1}^{M} \sigma_l^2. \quad (12)$$

where $\sigma_l^2$ is the estimated noise power of the l-th path. Again, as mentioned above, $\eta_{Biased}$ may be set to any appropriate value, e.g. $\eta_{Biased} = 1/4$.

The biased PI estimator 4 according to equation (11) reduces the false alarm probability $P_{fa}$ at lower SNR (bad channel conditions) at the expense of higher missed detections. At higher SNR the probability of missed detections $P_{md}$ converges to that of a conventional MAP detector using C=0 (e.g. 0.5-1 dB penalty at $P_{md}$=$10^{-2}$).

According to the extended biased PI estimator 4, the threshold C may be given in accordance with the following equation:

$$C = C_{ExtBiased\text{-}MAP} = \left(\frac{\eta_{SINR}}{SINR_{PICH}} - 1\right) \times \eta_{DistanceMetric}, \quad (13)$$

where $\eta_{SINR} > 0$, $0 < \eta_{Distancemetric} \leq 1$, and $$SINR_{PICH} = \frac{S_{PICH}}{\sigma_n^2}. \quad (14)$$

Again, the parameters $\eta_{SINR}$ and $\eta_{DistanceMetric}$ may be chosen from a wide range of values. By way of example, $\eta_{SINR}=1$ and/or $\eta_{DistanceMetric}=\frac{1}{4}$ may be used.

The extended biased PI estimator 4 reduces the false alarm probability at lower SNR and reduces the probability of missed detections $P_{md}$ at higher SNR (good channel conditions). By way of example, up to 1 dB performance gain at $P_{md}=10^{-2}$ may be obtained when compared to a conventional MAP detector using C=0. The reduction of false alarms at lower SNR reduces the power consumption and increases UE stand-by time. The reduced missed detections at higher SNR reduces the probability of a missed call. It is to be noted that at a higher SNR (good channel conditions) the missed detections are reduced at the expense of false alarms. However, stand-by time improvement is negligible for $P_{fa}<0.05$, see FIG. 8.

Figure 9:
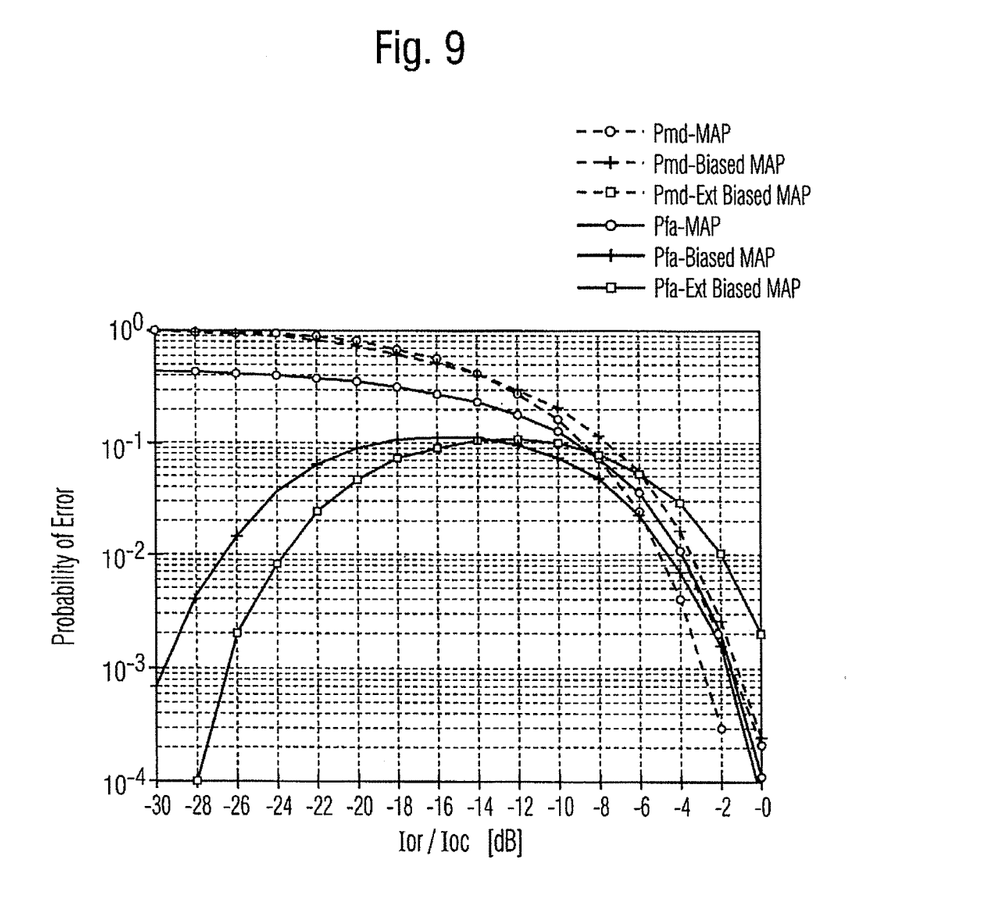
FIG. 9 is a graph illustrating simulation results of a probability of erroneous estimation of a paging indicator versus Ior/Ioc.

FIG. 9 is a graph illustrating a probability of error simulation results of $P_{md}$ and $P_{fa}$ versus Ior/Ioc in units of dB. Ior is the total transmit power spectral density and Ioc is the power spectral density of band-limited white noise. Ior/Ioc is also referred to as the geometry factor G in the art. Typically, the greater the geometry factor G, the better are the channel conditions and the higher is the SNR.

The simulations were performed on AWGN (Additive White Gaussian Noise) channel conditions and test scenario ITU VA30 at Ec/Ior=−19 dB for PICH. MAP corresponds to conventional threshold C=0, BiasedMAP corresponds to the threshold C according to equation (11) with $\eta_{Biased}=\frac{1}{4}$ and ExtBiasedMAP corresponds to the threshold C according to equation (13) with $\eta_{SINR}=1$ and $\eta_{DistanceMetric}=\frac{1}{4}$. Statements made above are verified by the results depicted in the graph.

Figure 10:
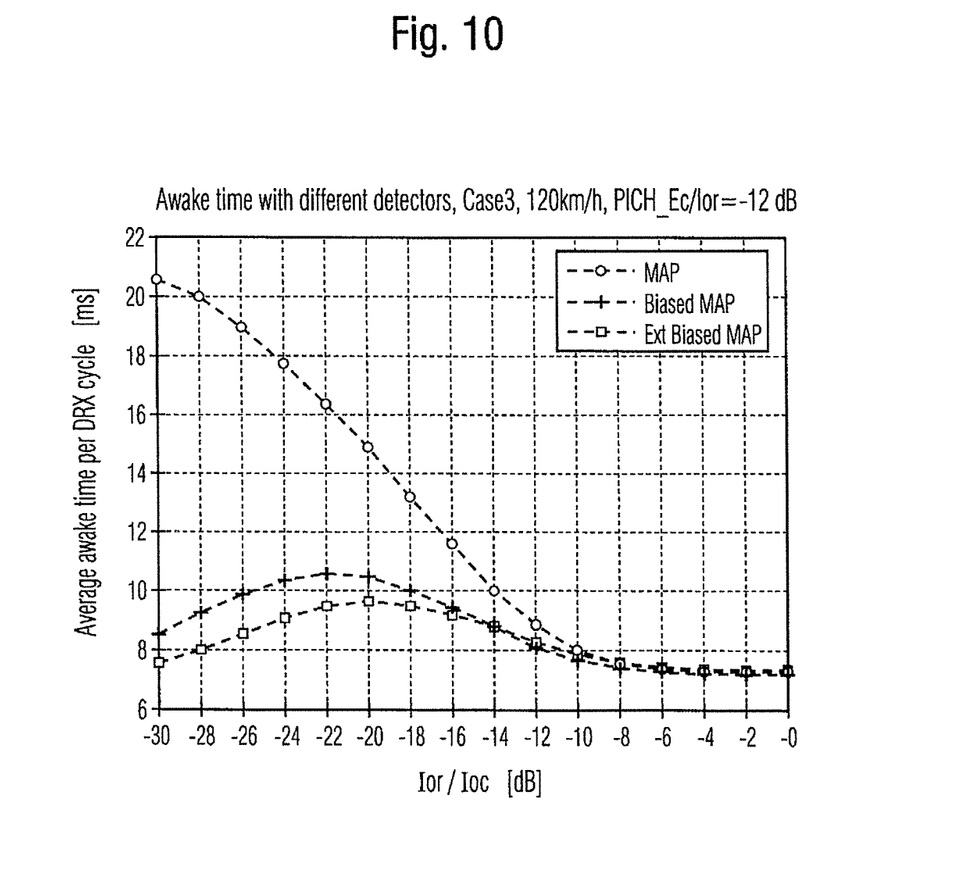
FIG. 10 is a graph illustrating the average awake time per DRX cycle versus Ior/Ioc.

FIG. 10 is a graph illustrating simulation results of the average awake time per DRX cycle in units of ms versus the geometry factor Ior/Ioc in units of dB. Simulation has been performed for Case3, 120 km/h, and Ec/Ior=−12 dB of PICH. Ec/Ior is the ratio in units of dB between the energy accumulated over one chip period (Ec) to the total transmit power spectral density (Ior). As may be seen from FIG. 10, both the biased PI estimation and the extended biased PI estimation significantly reduce the average awake time per DRX cycle at lower geometries (bad channel conditions).

Figure 11:
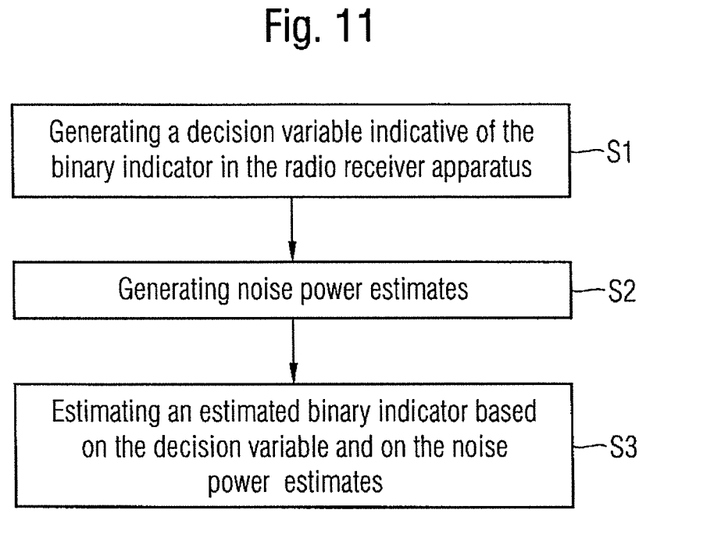
FIG. 11 is a flow chart illustrating an exemplary method of estimating a binary indicator.

FIG. 11 illustrates one exemplary method of estimating a binary indicator signaled from a transmitter over a channel to a radio receiver apparatus. In step S1, a decision variable indicative of the binary indicator in the radio receiver apparatus is generated.

In step S2, noise power estimates are generated.

In step S3, a binary indicator is estimated based on the decision variable and on the noise power estimates.

Figure 12:
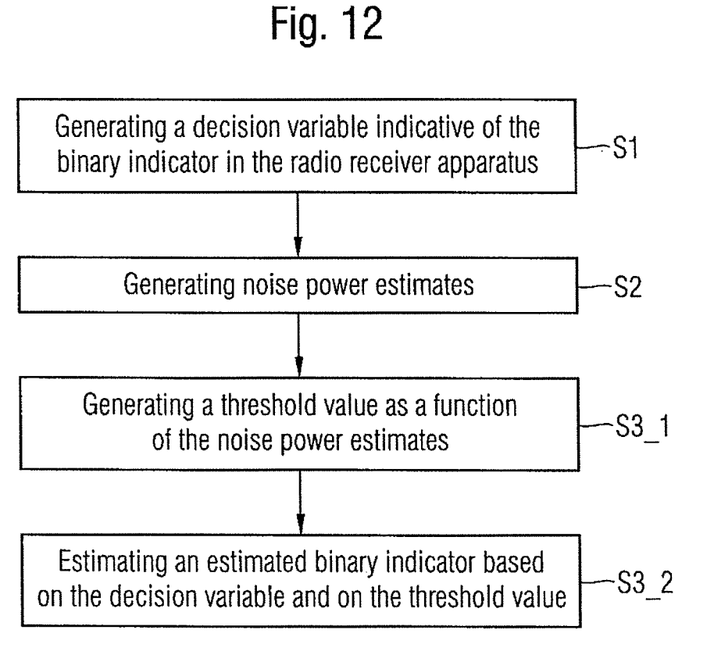
FIG. 12 is a flow chart illustrating an exemplary method of estimating a binary indicator.

FIG. 12 illustrates one further exemplary method of estimating a binary indicator signaled from a transmitter over a channel to a radio receiver apparatus. Step S1 and step S2 are the same as described above.

In step S3_1, a threshold value is generated as a function of the noise power estimates. As described above, the function may be modifiable in response to the performance (or quality) of the binary indicator estimation process. More specifically, an error rate (e.g. false alarm, missed detection, etc) of the indicator estimation process may be determined and the function may be adapted by a feedback mechanism in order to e.g. improve the performance of the binary indicator estimation process.

Then, according to step S3_2, the binary indicator is estimated based on the decision variable and on the threshold value.

It is to be noted that the implementations and methods described above are applicable to any binary decision made in a radio receiver apparatus. By way of example, in LTE receivers, the PHICH is used to report the Hybrid ARQ status. The channel carries the HARQ ACK/NACK indicator indicating whether a transport block has been correctly received or not. The HARQ indicator, by way of example, is 1 bit long, and "0" indicates ACK, and "1" indicates NACK. The PHICH is transmitted within the control region of a subframe and is typically only transmitted within the first symbol. However, if the radio link is poor, the PHICH may be extended to a number of symbols for robustness. Without saying, also other acknowledgement indicators transmitted over an acknowledgement indicator channel may be considered herein and the concepts and principles described above my be applied to the estimation of such acknowledgement indicators.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of embodiments described herein. Therefore, it is intended that this invention is limited only by the claims and the equivalents thereof.

What is claimed is:

1. A radio receiver apparatus, comprising:
a demodulator configured to output a decision variable indicative of a binary indicator signaled from a transmitter over a channel to the radio receiver apparatus;
a noise power estimator configured to generate noise power estimates indicative of noise experienced at the radio receiver apparatus;
a binary indicator estimator configured to generate an estimated binary indicator based on the decision variable and on the noise power estimates,
wherein the binary indicator estimator comprises a comparator configured to compare the decision variable with a threshold value, the threshold value being a function of the noise power estimates, and
wherein the function has a proportionality factor which is multiplied with the noise power estimates and an additive offset such that a function value is different from zero for the noise power estimates equaling zero.

2. The radio receiver apparatus of claim 1, further comprising:
a threshold value generator having an input coupled to an output of the noise power estimator and having an output coupled to an input of the binary indicator estimator, wherein the threshold value generator is configured to provide the threshold value at the output thereof.

3. The radio receiver apparatus of claim 1, further comprising:
an estimation error detector configured to detect an error of the estimated binary indicator; and
a feedback structure configured to change the function in response to an output of the estimation error detector.

4. The radio receiver apparatus of claim 3, wherein the feedback structure is configured to change the function so as to provide increased threshold values when an increased error rate has been determined by the estimation error detector.

5. The radio receiver apparatus of claim 3, wherein the estimation error detector is configured to determine a false alarm rate.

6. The radio receiver apparatus of claim 3, wherein the function is a homogeneous linear function and the feedback structure is configured to change a proportionality factor thereof in response to the output of the estimation error detector.

7. The radio receiver apparatus of claim 3, wherein the function is a nonhomogeneous linear function and the feedback structure is configured to change one or both of a proportionality factor and a bias value thereof in response to the output of the estimation error detector.

8. The radio receiver apparatus of claim 1, wherein the binary indicator is a paging indicator transmitted over a paging indicator channel.

9. The radio receiver apparatus of claim 1, wherein the binary indicator is an acknowledgement indicator transmitted over an acknowledgement indicator channel.

10. A method of estimating a binary indicator signaled from a transmitter over a channel to a radio receiver apparatus, comprising:
  generating a decision variable indicative of the binary indicator in the radio receiver apparatus;
  generating noise power estimates indicative of noise experienced at the radio receiver apparatus;
  estimating a binary indicator based on the decision variable and the noise power estimates;
  generating a threshold value based on the noise power estimates, wherein the threshold value is a function of the noise power estimates, and wherein the function has a proportionality factor which is multiplied with the noise power estimates and an additive offset such that a function value is different from zero for the noise power estimates equaling zero; and
  comparing the threshold value with the decision variable to estimate the binary indicator.

11. The method of claim 10, further comprising:
  detecting estimation errors of the estimated binary indicator;
  determining a rate of estimation errors; and
  changing the function in response to the rate of estimation errors.

12. The method of claim 10, wherein the binary indicator is a paging indicator transmitted over a paging indicator channel.

13. The method of claim 10, wherein the binary indicator is an acknowledgement indicator transmitted over an acknowledgement indicator channel.

14. A radio receiver apparatus, comprising:
  a demodulator configured to output a decision variable indicative of a binary indicator signaled from a transmitter over a channel to the radio receiver apparatus;
  a noise power estimator configured to generate noise power estimates indicative of noise experienced at the radio receiver apparatus;
  a threshold value generator configured to provide a threshold value as a function of the noise power estimates;
  a binary indicator estimator configured to generate an estimated binary indicator based on the decision variable and the threshold value; and
  a feedback structure configured to change the function in response to an estimation performance of the binary indicator estimator.

15. The radio receiver apparatus of claim 14, further comprising:
  an estimation error detector configured to detect an error of the estimated binary indicator, wherein the feedback structure is configured to change the function in response to an output of the estimation error detector.

16. A method of estimating a binary indicator signaled from a transmitter over a channel to a radio receiver apparatus, comprising:
  generating a decision variable indicative of the binary indicator in the radio receiver apparatus;
  generating noise power estimates indicative of noise experienced at the radio receiver apparatus;
  generating a threshold value as a function of the noise power estimates;
  estimating an estimated binary indicator based on the decision variable and the threshold value; and
  changing the function in response to an estimation performance of the binary indicator estimator.

17. The method of claim 16, further comprising:
  changing the function in response to an estimation error rate of the estimated binary indicator.

18. The method of claim 16, wherein the binary indicator is a paging indicator transmitted over a paging indicator channel and/or an acknowledgement indicator transmitted over an acknowledgement indicator channel.

* * * * *